2 Sheets--Sheet 1.

ELIZA S. CONKLIN & J. STAFFORD.

Cultivators.

No. 5,827. Reissued April 7, 1874.

Witnesses,
P. Hannay
Thos. Worthley

Inventors,
Eliza S. Conklin
Joseph Stafford
by W. B. Richards & A. McCallum
Attorneys.

AM. PHOTO-LITHOGRAPHIC CO. N.Y. (OSBORNE'S PROCESS)

2 Sheets--Sheet 2.

ELIZA S. CONKLIN & J. STAFFORD.

Cultivators.

No. 5,827. Reissued April 7, 1874.

Witnesses,
P. Hanway
Thos. Childes

Inventors,
Eliza S. Conklin
Joseph Stafford
W. B. Richards & A. McCallum
Attorneys.

AM. PHOTO-LITHOGRAPHIC Co. N. Y. (OSBORNE'S PROCESS.)

UNITED STATES PATENT OFFICE.

ELIZA S. CONKLIN, OF MACON COUNTY, EXECUTRIX, AND JOSEPH STAFFORD, OF KNOX COUNTY, ILLINOIS, ASSIGNEE OF DANIEL S. STAFFORD, DECEASED.

IMPROVEMENT IN CULTIVATORS.

Specification forming part of Letters Patent No. 129, dated January 15, 1861; reissue No. 5,827, dated April 7, 1874; application filed September 20, 1870.

*To all whom it may concern:*

Be it known that DANIEL S. STAFFORD, deceased, late of Decatur, in the county of Macon and State of Illinois, invented certain Improvements in Cultivators, of which the following is a specification:

The nature of the invention relates to improvements in straddle-row cultivators, or machines for cultivating corn and other crops which are planted in rows, by means of which both sides of a single row of plants may be tilled or cultivated simultaneously, by a single passage of the machine along the row which it straddles, said machine being so constructed as to cultivate and not destroy such plants as may be growing out of the line of the row, and also so that the plows or cultivator-teeth may be raised entirely above the surface of the soil, for the purpose of transporting the machine from field to field, or of turning it at the end of the row, and of being again lowered, as required.

To enable others skilled in the art to make, construct, and use this improved cultivator, we will now proceed to describe its parts in detail, and as combined.

Figure 1:
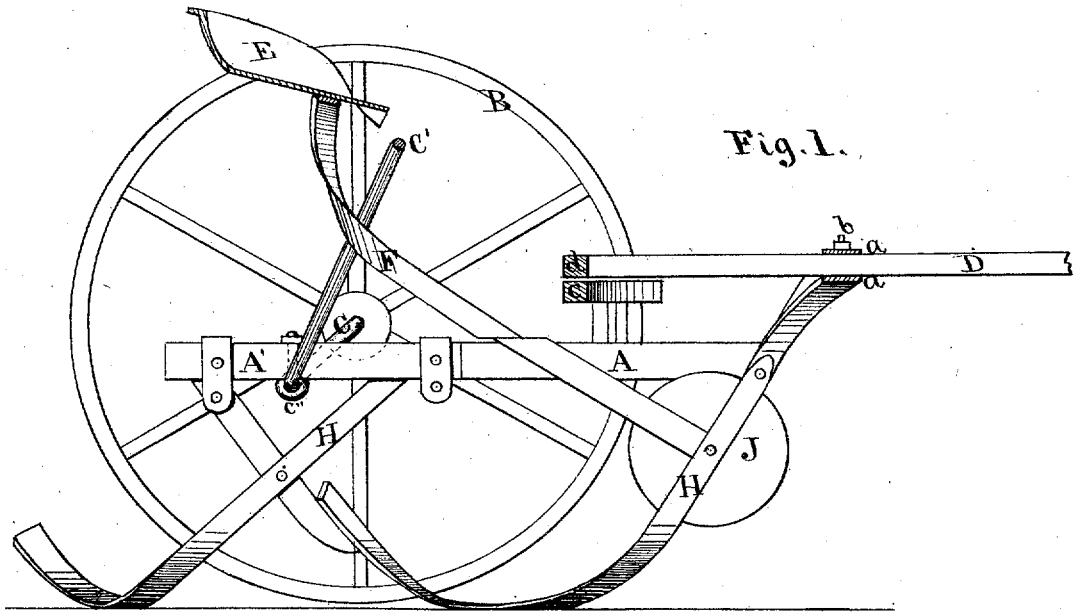
Figure 2:
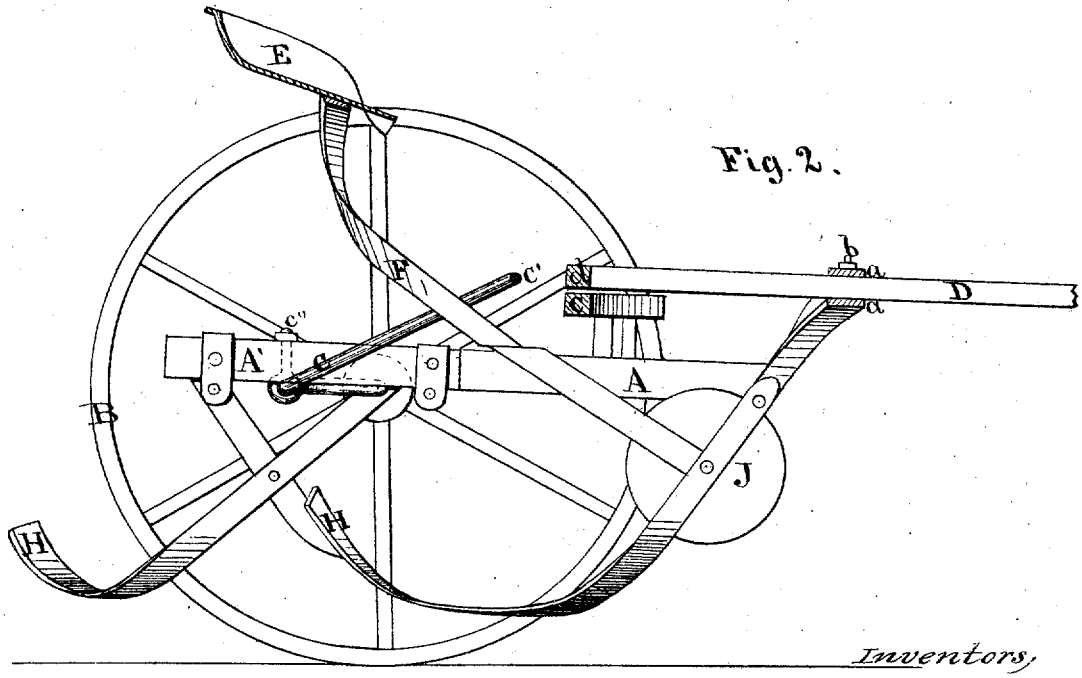
Figure 3:
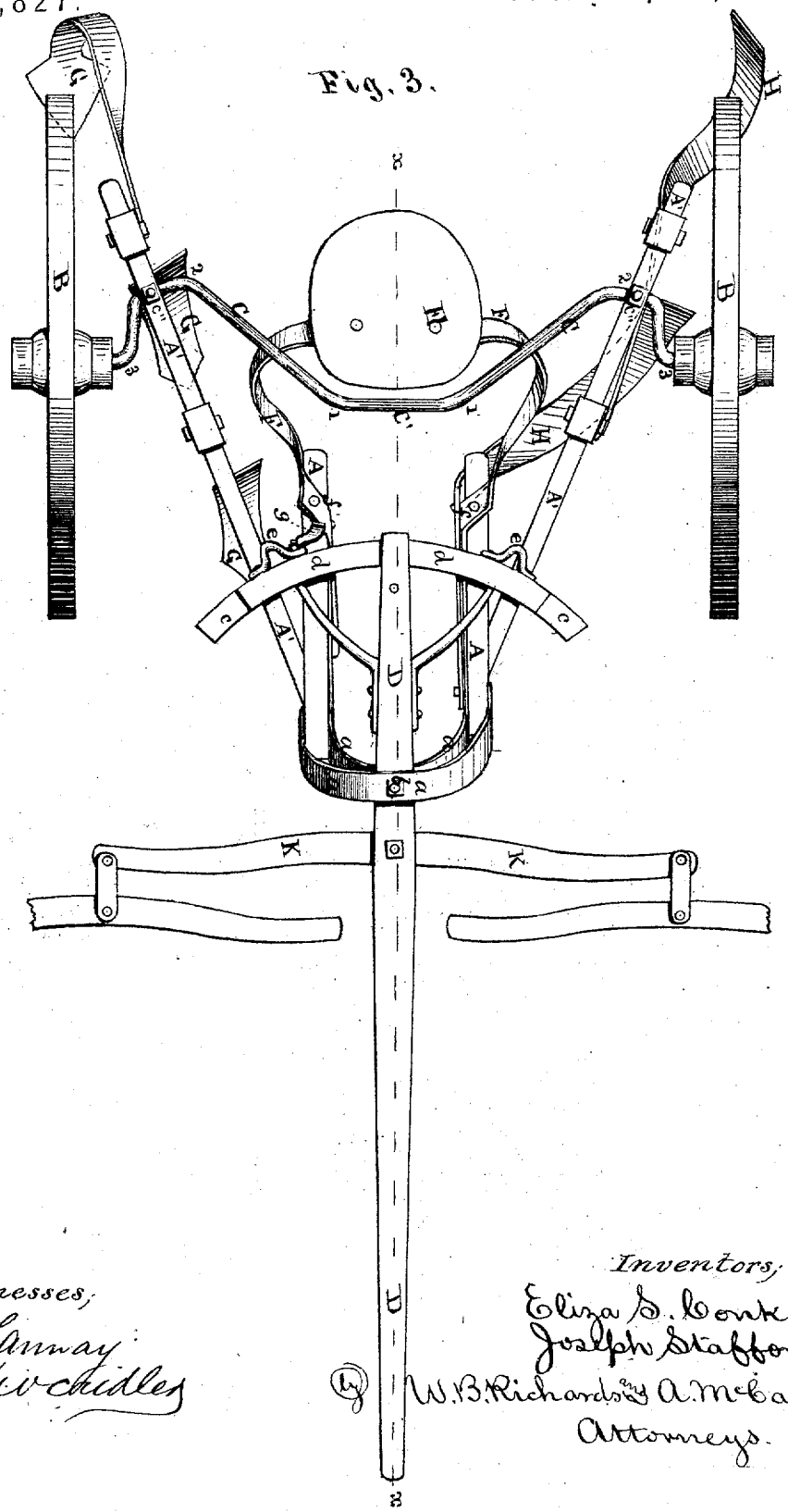

In the accompanying drawing, Figure 1 represents a longitudinal section on the line *x x* of Fig. 3, showing the cultivating-share let down as when in operation. Fig. 2 is a similar section, with the cultivator, raised from the ground, as when the machine is being moved from place to place. Fig. 3 represents a top-plan view of the cultivator.

A represents two parallel beams, to which are attached the plow-beams A′, as shown in the drawings. The forward ends of the beams A are secured between the ends of two curved beams or rods, *a*, which form an arch across the front of the machine. These beams *a* may be made of any suitable shape and material convenient or suitable for the purpose hereinafter set forth, so long as an elevated central space is provided to clear the top of the row being cultivated. The beams A, A′, and *a* together constitute the main frame of the machine, which rests on the axle C, and to which it is attached or connected by means of the eyebolts *c*″, the axle passing through the eyes of the bolts, which are secured to the plow-beams A′. B represents two large wheels, on which the frame of the machine is supported, and on which, through the instrumentality of the axle, it may be raised or lowered, as desired. The axle C is of peculiar construction, as shown in the drawings. It has three angles, 1 2 3, on each side, the central portion C′ being straight, and brought upward and forward in front of the driver's seat, convenient for operation by his feet. The axle is made in this peculiar form in order that it may perform several important functions in the operation of the machine. Primarily, it is the axle on which the large wheels B rotate. On it the frame rests; and, as will hereafter more fully appear, it is the means by which the plow-gangs are raised or lowered, as desired; but this particular form need not be strictly adhered to. Any other curved or angled form of axle may be used which would perform the same offices. D is the draft-pole or tongue of the machine. It passes between the curved beams *a*, and is pivoted thereto at *b*, the center of the arch. On the rear end of the tongue D a segment, *d*, is rigidly secured. *c* is a corresponding segment, attached to the frame between the beams A. The segment *d* rests or slides upon *c*, and has on its rear or convex side two projecting stirrups or lugs, *e*, one on each side, convenient to the feet of the driver. E is the driver's seat, arranged over, and slightly in rear of, the middle portion of the axle, and at a sufficient elevation, so that, when seated, the driver may conveniently rest his feet upon the stirrups *e*, and use them, as hereinafter shown. The seat E is supported on a piece of bent metal, F, the ends of which are secured to the beams A at *f f*. From its position and construction it acts as a spring as well as a support for the seat. Any other suitable support for the driver's seat may, however, be adopted. *g* is a catch, secured to the beam A, its office being to retain the axle in position, as shown by Fig. 2—that is, when the plow-gangs are raised clear of the ground. Ordinary cultivator-teeth or plows G, attached to standards secured and adjusted to the plow-beams at any distance apart, as desirable, are shown on one side of the machine. On the other side shares or cutters H are shown. They are made of thin bent metal, and so constructed and secured to the plow-beam as to operate by cutting under, and, with their rear ends, throw the pulverized soil toward the plants. J J are small supporting or auxiliary wheels secured to the frame in front of the machine, to prevent the forward cultivators from penetrating too deep. K are the double-trees, the tongue, &c., being arranged for a center-draft machine, the horses walking one on each side of the row that is being cultivated.

In the machine thus constructed it will be perceived that the central parts—the tongue, the central portion of the axle, the driver's seat, &c.—are all elevated sufficiently high to pass over the crop being cultivated without injury thereto. Of course, the height of the machine is limited, and when used for the cultivation of corn, or such like tall-growing plants, it is only available during the earlier stages of their growth; but as that is the only period during which rapid and frequent cultivation is essential for the well-being of the crop, and consequently wherein lies the greatest expense in its production, it has been found that, by the more frequent cultivation which the use of this machine renders practicable during that period, the necessity for later cultivation is, in a great measure, obviated; and that, after the machine becomes inoperative through the growth of the crop, the latter may safely be left to itself, and thereby a great saving in time, trouble, and expense is effected.

The operation of the machine is as follows: The machine being in position, as shown in Fig. 2 of the drawings, with the plows or cultivators raised clear from the ground and secured in that position by the catch *g* engaging with the axle, the horses are hitched up, one on each side of the tongue, and the driver, taking his seat on the machine, with his feet resting on the stirrups *e* of the segment *d*, proceeds to the field to be cultivated. Arrived at the field, the driver directs the horses to the spaces on each side of a row, so as to have the pole or tongue enter directly over and in line with a row of the crop to be cultivated; he then, with his foot, disengages the catch *g* from the axle, and thereby allows the cultivators to fall to the ground by their own gravity. The machine will now be in position, as shown in Fig. 1, and is ready for operation. It straddles the row; the tongue is directly over the row, which thus forms a certain guide for the line of progression; the plow-gangs are arranged on each side of the row, their front teeth close to it, and the others set at intervals on the plow-beams, diverging diagonally therefrom. Everything being thus in order, the driver sets the team in motion and proceeds along the row, tilling the soil on each side of it.

Perched in his elevated seat over the axle, and in rear of the devices for operating the machine, the driver can easily observe what is before him, and when he comes to any plants that may be growing slightly out of line, either to the right or left of the row, he presses his feet on the stirrups *e* of the segment *d*, directing the pressure either to the left or right, as the case may be, and by clamping the segments *d* and *c* by means of this pressure of his feet he changes the direction of the plows, causing them to run in or out from the row, and thus avoid plowing out such irregular plants, while the horses and the tongue of the machine proceed without deviation from the direct line of progression. By removing the pressure thus brought to bear on the segments *c* and *d*, the cultivator again conforms to the line of progression.

When any obstacle appears in the way over which it is necessary to clear the cultivators, the driver removes his feet from the stirrups, and with them presses down the portion *c'* of the axle, which, being so constructed as to act as a compound lever, working upon itself, with the hubs of the wheels B for fulcrums, and the frame of the machine being attached to the axle, the plows are thereby raised until the obstacle is passed, when, by removing his feet from the axle, they again descend and resume operation.

Sometimes it will be necessary, not only to raise the plows clear of the ground, but also to direct the frame of the machine to the right or left at the same time, and when the end of the row is reached, this double operation is especially convenient in order to facilitate the turning of the machine. This is accomplished by the driver pressing down the axle with one foot, while with the other he clamps the segments, as hereinbefore described.

These operations, it will be perceived, are performed by the action of the driver's feet, thereby leaving him the free use of his hands wherewith to guide the team, which may be kept in continuous motion.

What is claimed as the invention, and which we desire to secure by Letters Patent, is—

1. The combination, in a straddle-row cultivator, of frame A, wheels B, series of plows G, arranged in two gangs, with a central space between the gangs, and elevated or bent axle C, constructed substantially as described, to permit the corn to pass under it, and to raise or lower the plow-frame, as set forth.

2. The elevated pole D, segmental slides *c* and *d*, and stirrups *e*, in combination with frame *a a*, as and for the purpose set forth.

3. With the foregoing devices of second claim, the axle C and driver's seat E, in combination, for the purposes set forth.

4. The combination, in a straddle-row cultivator, of the two wheels B, axle C, frame A, series of plows G, and supplementary wheels J, all operating in combination, for the purpose set forth.

5. In a straddle-row cultivator, the share-blades H, constructed as described, in combination with frame A, bent axle C, and wheels B, substantially as and for the purpose set forth.

ELIZA S. CONKLIN.
JOSEPH STAFFORD.

Witnesses for ELIZA S. CONKLIN:
W. T. CUSSINS,
EDWIN PARK.

Witnesses for JOSEPH STAFFORD:
D. HENRY CLARKE,
H. B. BERGEN.